UNITED STATES PATENT OFFICE.

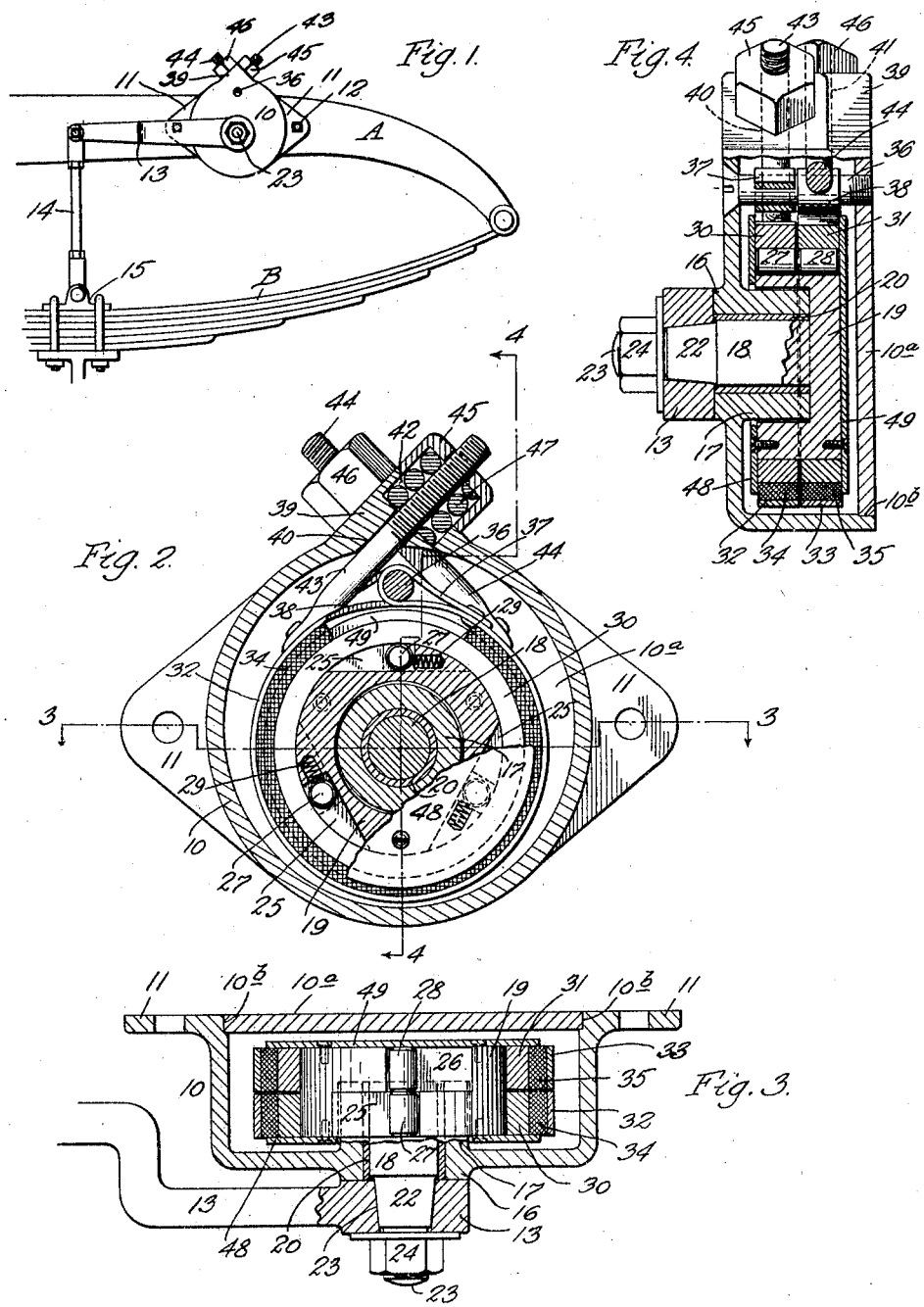

HERBERT J. HOWERTH, OF CLEVELAND, OHIO.

SHOCK-ABSORBER.

1,393,374. Specification of Letters Patent. Patented Oct. 11, 1921.

Application filed October 25, 1920. Serial No. 419,230.

*To all whom it may concern:*

Be it known that I, HERBERT J. HOWERTH, a citizen of the United States, residing at Cleveland, in the county of Cuyahoga and State of Ohio, have invented a new and useful Improvement in Shock-Absorbers, of which the following is a specification.

This invention relates to shock absorbers or snubbers of the type used on vehicles to provide a shock absorbing connection and resistance between the body of the vehicle and the running gear and springs.

The objects of the present invention are to provide a shock absorber which will effectually resist and modify movement of the springs and running gear toward and from the body of the vehicle and effectually absorb and modify both positive and rebound movement of the running gear and springs; also to provide a shock absorber of simple but strong construction and which consists of relatively few parts; also to provide a shock absorber which is dust proof; also to provide a shock absorber which is readily adjustable to vary the strength of the resistance offered to movement of the running gear in either direction relatively to the body of the vehicle; and to provide a shock absorber which is readily adjustable to offer different definite and predetermined resistances to movements of the running gear relatively to the vehicle body. Further objects are to provide improvements in shock absorbers in the other respects hereinafter described and claimed.

In the accompanying drawings:—

Figure 1 is an elevation of a portion of a vehicle frame and spring equipped with a shock absorber constructed in accordance with this invention.

Fig. 2 is a sectional elevation of the body of a shock absorber constructed according to the present invention.

Fig. 3 is a section thereof on line 3—3, Fig. 2.

Fig. 4 is a section thereof, on line 4—4, Fig. 2.

Referring to the drawings:

A designates a portion of the body frame of an automobile and B a body supporting spring. The parts just referred to are of a common or usual type and may be of any desired type, and form no part of the present invention. In the embodiment of the invention illustrated, 10 designates a casing or housing which contains the resistance members of the shock absorbing device and 10ª designates a removable cover therefor which preferably seats on shoulder portions 10ᵇ formed in the casing. The casing 10 is preferably attached to the frame member A and for this purpose it may be provided with attaching flanges or ears 11 which are adapted to be secured to the frame member A by suitable bolts or nuts as at 12. It is obvious that other attaching means may be used, if desired. 13 designates an operating arm or lever connected by a link 14 to the spring B. The link 14 may be attached to the spring B by suitable means as by a shackle 15.

The casing 10 is preferably provided with an annular boss 16 on its outer face, which boss surrounds an opening through the face of the casing, the opening and the surrounding boss being preferably eccentrically disposed relatively to the axis of the casing. A second boss 17 preferably surrounds the opening and projects inwardly from the inner face of the casing. An end of the lever 13 bears against the annular boss 16 and carries a shaft or pin 18 on which is formed or fixed within the casing, a cylindrical drum 19 which bears upon the annular boss 17. The drum is preferably mounted in the lower part of the casing so as to leave a space between the upper part of the drum and the top of the casing for a purpose hereinafter set forth. As illustrated, the shaft or pin 18 extends through the opening in the casing and may be formed integrally with the drum as shown or rigidly connected thereto in any suitable manner. 20 designates a bushing surrounding the bearing surface of the shaft 18. The shaft 18 is also preferably formed with an outer substantially frusto-conical portion 22 which is adapted to wedge into a suitable hole in the lever 13 and a projecting threaded portion 23 which carries a suitable nut 24 for wedging the shaft into the lever. Other drum and lever connecting means than the preferred embodiment illustrated may be used, if desired.

The peripheral face of the drum 19 is provided with pairs of oppositely tapered recesses 25 and 26, the members of each pair being preferably alined on opposite sides of the median plane of the drum 19. Movable clutch members are positioned in the recesses 25 and 26. In the embodiment illustrated, 27 and 28 designate clutch rollers positioned respectively in the recesses 25 and 26. Each clutch roller is normally forced outwardly by means of a suitable spring 29, one of such springs being positioned in each recess. In the embodiment of the invention illustrated, there are shown three pairs of recesses and three pairs of clutch rollers but it is to be understood that the number of pairs of recesses and clutch elements may be varied and one or more pairs of clutch elements may be provided as desired, and that other movable clutch elements such as balls or pawls may be used.

30 and 31 designate a pair of loose rings, the ring 30 extending around the periphery of the drum 19 and at one side of its median plane and being adapted to contact with the clutch roller 27, and the ring 31 extending around the periphery of the drum 19 at the other side of its median plane and being adapted to contact with the clutch roller 28. When the drum turns in one direction (in a clockwise direction in the embodiment illustrated) it will clutch and turn the ring 30 and when it turns in the other direction (counter-clockwise in the embodiment illustrated) it will clutch and turn the ring 31. 32 and 33 designate a pair of brake bands surrounding the respective clutch rings 30 and 31. These brake bands are provided with any suitable friction facings as at 34 and 35. Each of the brake bands 32 and 33 is held at one end by a stud or set screw 36 fixed in the casing, and for this purpose they are preferably provided with looped ends 37 and 38 through which the stud projects, the brake bands extending in opposite directions from the stud, each around its respective clutch ring. The set screw or lug 36 preferably serves also to secure the cover to the casing, for this purpose engaging a suitable threaded hole in the cover to securely hold the cover in place. The other ends of the brake bands are adjustably attached to the casing so that the frictional resistance of the device may be readily regulated by tightening or loosening the bands about the rings. This is preferably accomplished as illustrated, by providing the casing with a side enlargement or shouldered portion 39 having apertures 40 and 41 therethrough, these apertures preferably extending in intersecting planes tangential to the friction facings of the brake bands. The apertures 40 and 41 each communicate with one of a pair of recessed seats 42 formed in the outer face of the enlargement 39. Threaded rods 43 and 44 are attached to the ends of the brake bands 32 and 33; these rods project through the respective apertures in the enlarged portion and are engaged and held adjustably in place by recessed nuts 45 and 46. A spring 47 is preferably interposed between each of the recessed seats 42 and the nuts 45 and 46, these springs tending to tighten the brake bands about the clutch rings and to take up any slack in the brake bands. As illustrated in Fig. 2 of the drawings, the springs 47 are inclosed by the enlarged portion 39 and the side flanges of the recessed nuts, the flanges of the nuts normally seating upon the enlarged portion thereby preventing an accumulation of dust or dirt upon the spring or rod. 48 and 49 designate guard plates or rings suitably secured to the drum and bearing upon the side edges of the respective brake linings to maintain the loose rings and brake bands in proper position around the rings. By reason of the tangential inclination of the apertures in the enlarged shoulder relatively to the friction linings of the brake bands, the threaded rods 43 and 44 may be made of material of relatively light weight and the rods are not liable to bend or become distorted, as the lines of force applied to the linings of the brake bands are tangential to the linings and culminate in movement of the bands in a line coincident with the axial lines of the threaded rods, and the threaded rods will not bind or jam in the apertures in the casing but are freely slidable lengthwise therethrough. The inclination of these apertures and of the threaded rods projecting therethrough also prevents distortion or bending of the brake bands and promotes an even braking action by reason of the springs 47 automatically acting to take up any slack in the brake bands.

In the use of the device, it is apparent that movement of the lever in one direction will turn one of the clutch rings against frictional resistance of one of the brake bands and movement of the lever in the other direction will turn the companion clutch ring against frictional resistance of the other brake band. The frictional resistance of the brake bands may be regulated by adjustment of the nuts 45 and 46, whereby the device is readily adjustable for service with loads of different weights and which also permits of adjustment for different resistances to movements in different directions. It is thus possible to provide a relatively great resistance to positive movements arising from road shocks and a relatively small resistance to rebound movement, or contrawise. The eccentric mounting of the drum in the lower part of the casing provides a space between the upper part of the drum and the casing for the set screw 36 and portions of the threaded rods 43 and 44, thus obviating the necessity for any undue enlargement of the casing and reducing the size of the projecting parts on the outside of the casing, thereby tending to produce a more economical and more sightly structure. By reason of the provision of the space in the upper part of the casing above the drum, and the relative positions of the apertures 40 and 41, the end attaching portions of each of the brake bands overlap, thus providing for frictional contact between the loose rings and their respective brake bands throughout a relatively large area, thereby insuring a more even and effective frictional resistance.

I claim as my invention:

1. In a shock absorber, the combination of a casing, a lever, a shaft mounted to rock in said casing and connected at one end to said lever, a drum connected to said shaft to rock therewith, said drum having a pair of oppositely tapered peripheral recesses, a movable clutch element in each of said pair of recesses, a pair of clutch rings loosely mounted on said drum, and a pair of brake bands arranged for contact with said clutch rings whereby when said drum is turned in one direction one of said clutch rings will be turned and frictionally engage one of said brake bands and when the drum is turned in the other direction the other of said clutch rings will be turned and frictionally engage the other of said brake bands.

2. In a shock absorber, the combination of a casing, a lever, a shaft mounted to rock in said casing and connected at one end to said lever, a drum connected to said shaft to rock therewith, said drum having a pair of oppositely tapered peripheral recesses, a movable clutch element in each of said pair of recesses, a pair of clutch rings loosely mounted on said drum, a pair of brake bands arranged for contact with said clutch rings whereby when said drum is turned in one direction one of said clutch rings will be turned and frictionally engage one of said brake bands and when the drum is turned in the other direction the other of said clutch rings will be turned and frictionally engage the other of said brake bands, and means for adjusting said brake bands to vary the frictional resistance to turning movement of said clutch rings.

3. In a shock absorber, the combination of a fixed casing provided with an enlarged side portion having apertures therethrough, recessed seats in said enlarged portion and communicating with said apertures, a lever mounted to oscillate relatively to said casing, a shaft extending from one end of said lever into said casing, movable clutch members mounted on said shaft, a pair of clutch rings loosely mounted in said casing, said movable clutch members being so mounted that upon turning movement of said shaft in one direction one of said clutch rings will be turned therewith and upon turning movement of said shaft in the other direction the other of said clutch rings will turn therewith, and a pair of brake bands, one surrounding one of said clutch rings and the other surrounding the other of said clutch rings, said brake bands each having a looped end, a stud secured to the casing and engaging the looped ends of said brake bands, threaded rods on the other ends of said brake bands, said rods projecting through the apertures in the enlarged portion of said casing, and adjusting nuts on the projecting ends of said threaded rods.

4. In a shock absorber, the combination of a fixed casing, a shaft mounted to rock in said casing, a drum on said shaft, a lever connected at one end to said shaft, a brake band in said casing and surrounding the periphery of said drum at one side of the median plane thereof, a second brake band in said casing and surrounding the periphery of said drum at the other side of the median plane thereof, and selective clutch means on said drum for engaging one of said brake bands when said drum is turned in one direction and for engaging the other of said brake bands when said drum is turned in the other direction to frictionally resist movement of said lever relatively to said casing.

5. In a shock absorber, the combination of a casing, a shaft mounted for rocking movement in said casing, a lever fixed at one end to said shaft and adapted to move relatively to said casing, a drum connected to said shaft for rocking movement within said casing, a pair of clutch rings mounted side by side on the periphery of said drum, means on said drum for turning one of said clutch rings when said drum is turned in one direction and for turning the other of said clutch rings when said drum is turned in the other direction, a stud projecting through said casing, a pair of brake bands each having an end engaging and held by said stud, one of said brake bands surrounding one of said clutch rings and the other of said brake bands surrounding the other of said clutch rings, said brake bands extending in opposite directions around said clutch rings, adjustable attaching portions on the ends of said brake bands, said casing having oppositely inclined apertures therethrough in planes tangential to the friction facings of said brake bands, the attaching portion of one of said bands projecting through one of said apertures in the casing, the other of said attaching portions projecting through the other of said apertures, and adjusting nuts on the projecting ends of said brake band attaching portions for regulating the tension of said brake bands.

6. In a shock absorber, the combination of an oscillatory member, a pair of friction bands surrounding the periphery of said oscillatory member, means for regulating the tension of said friction bands, and means on said oscillatory member for frictionally engaging one of said friction bands when said oscillatory member is turned in one direction and for frictionally engaging the other of said friction bands when said oscillatory member is turned in the other direction.

7. In a shock absorber, the combination of a casing, a selective clutch mechanism mounted for turning movement in said casing, said clutch mechanism being eccentrically disposed relatively to the exis of said casing, and a friction faced element surrounding said clutch mechanism whereby when said clutch mechanism is turned in one direction movement thereof will be resisted by said friction element, said friction faced element having overlapping ends within said casing.

8. In a shock absorber, the combination of a casing, a shaft mounted to rock in said casing, a drum fixed to said shaft within said casing for rocking movement with said shaft, a pair of rings loosely mounted on said drum, means mounted on said drum for turning one of said rings when the drum is turned in one direction and for turning the other of said rings when the drum is turned in the other direction, friction facings surrounding said loose rings, and guard plates at the ends of said drum and having portions extending outwardly from the periphery of said drum for retaining said rings and said friction facings in position around said drum.

Witness my hand this 20th day of October, 1920.

HERBERT J. HOWERTH.